Oct. 31, 1967   B. D. PARKER   3,349,614
SPEED MEASURING DEVICES
Filed Nov. 22, 1965
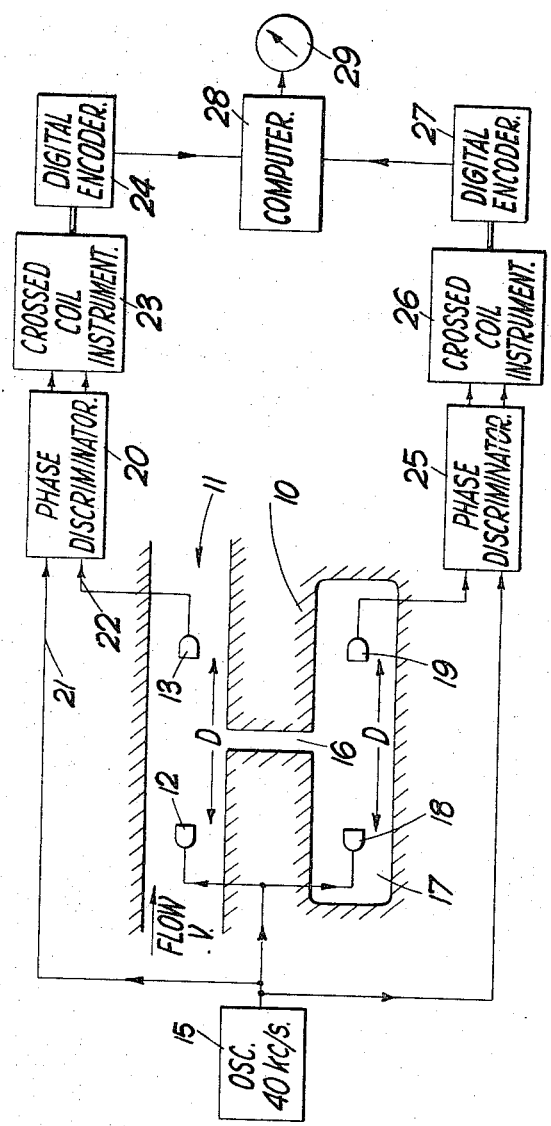

3,349,614
SPEED MEASURING DEVICES
Bernhard Dollman Parker, London, England, assignor to Decca Limited, London, England, a British company
Filed Nov. 22, 1965, Ser. No. 509,106
Claims priority, application Great Britain, Nov. 24, 1964, 47,806/64
8 Claims. (Cl. 73—181)

ABSTRACT OF THE DISCLOSURE

A speed measuring device for use on a body movable relative to a fluid comprises a first electro-acoustic transmitting and a first electro-acoustic receiving transducer mounted on the body to be spaced apart in the moving fluid, a phase discriminator comparing the phase of the received acoustic signals with the transmitted signals and a phase cycle counter to count cycles of phase change. A second similar pair of transducers in fluid at rest are used to obtain a second phase measurement and the speed is computed automatically from measurements.

---

This invention relates to devices for measuring the speed of a fluid relatively to a body which may be used for example, for an air-speed indicator for an aircraft.

It has been proposed to measure the speed of a liquid passing through a pipe by determining the phase difference of ultrasonic signals transmitted through the liquid in different directions with respect to the direction of liquid flow. For example it has been proposed to transmit ultrasonic signals over two different paths to a pipe, each path extending to a transducer on one side of the pipe to another transducer on the opposite side of and spaced along the pipe from the first transducer. In the case of a gas, the velocity of propagation of sound waves varies considerably with temperature and also varies to a lesser extent with the pressure.

It is an object of the present invention to provide an improved form of ultrasonic speed measuring apparatus in which the speed of a body relative to a fluid can be determined irrespective of the variations of velocity of propagation of sound waves to a fluid.

According to the present invention, in a speed measuring device for a body movable in a fluid, there are provided, on the body, means for propagating a sonic signal along a path through the fluid means and means for measuring the phase relation between the sonic signal at points spaced in the direction of motion. Unlike prior devices in which the difference of phase along two paths is determined, in the present invention, the total phase change along a path through the fluid is measured. In the simplest form of the apparatus, the phase relationship between the received and transmitted signals may be determined when the body is at rest with respect to the fluid and subsequently when the body is moving in said fluid; from the two phase readings, as explained hereinafter, the velocity of the body with respect to the fluid may be determined. The determination of the phase change over a known path when the body is at rest, in effect, enables the velocity of propagation to the medium to be determined and used in determining, from the second phase difference measurement, the velocity of the body with respect to the fluid.

Conveniently however, a chamber is provided in said body to which is admitted fluid to be substantially at rest relative to said body and there are provided means for progagating a sonic signal through said fluid in said chamber and means for measuring the phase relation between the sonic signal at points spaced apart in the direction of propagation of the signal through the chamber. The chamber may conveniently have a static port open to the fluid stream moving relative to the body so that the fluid in the chamber is at the same static pressure and temperature as the fluid in the moving stream; the velocity of propagation of sound waves through the fluid in the chamber will thus be the same as that in the fluid moving relatively to the body. The phase measurement between points spaced in the chamber thus enables the velocity of propagation to be determined. As will be explained later, it is not necessary to determine the velocity of propagation; the phase measurement reading can be used to eliminate the magnitude velocity of propagation from the determination of the velocity of the body relatively to the fluid.

In referring to sonic signal, it will be understood that the frequency need not be an audio frequency and it would usually be ultrasonic, for example 40 kc./s.

The means for measuring the phase relation conveniently comprises a phase discrimination for determining the phase angle between the signals at said points and integrating means responsive to the output of the phase discriminator for counting complete cycles of phase change in said output. Electrical phase discriminator circuits are well known and reference may be made for example to British patent specification Nos. 620,507 and 624,042 which describe circuits producing direct voltages proportional to the sine and cosine of the phase angle between two alternating current inputs. Such direct voltages may be applied to orthogonal coils of a crossed coil phase angle indicator having a rotor which takes up a position dependent on the signals applied to the coils and which drives an integrating counter. Such an indicating meter is described for example in specification No. 2,499,326. An integrating phase meter, once it is initially set correctly, will indicate the total phase difference correctly even though this phase difference includes complete cycles of phase. The total phase difference along the path through the static pressure chamber will depend on the temperature and when the equipment is first switched on, it will have to be set to the appropriate number of complete cycles. The phase discriminator will determine the fractional part of a cycle accurately and it is merely necessary to make the coarse adjustment to the correct number of complete cycles. In practice this is conveniently done manually, using a calibration for temperature. It will be appreciated that it is only the coarse adjustment which is required and hence it is only necessary to determine the temperature and the resultant correction to sufficient accuracy to ensure the number of complete cycles of phase change is correct.

Since the sonic signal is conveniently produced by feeding an electrical signal of the appropriate frequency to a transducer, it is convenient to determine the phase relationship electrically between an electrical signal fed to a transmitting transducer and an electrical signal produced by a receiving transducer.

The invention thus includes within its scope a speed measuring device for a body movable in a fluid comprises two transducers adapted to be mounted on the body in said fluid and spaced in the direction of motion, the first of said transducers being for transmitting sonic signals and the second of said transducers for receiving the sonic signals from the first transducer after passing through the fluid, and means for comparing the phase of the signal received by the second transducer with the phase of the transmitted signal or of a signal in known phase relation thereto.

As previously explained there may be provided, on said body, a chamber to which is admitted fluid to be substantially at rest relative to the body and, in this case, third and fourth transducers may be spaced apart in said chamber, the third transducer receiving sonic signals from the fourth transducer and phase comparison means may be provided for comparing the phase of the signal received by the third transducer with the phase of the signal transmitted by said fourth transducer or of a signal in known phase relation thereto.

Particularly for an air speed measuring device suitable for use on an aircraft, the first and second transducers conveniently are spaced apart along a tube through which the fluid (the air in an air speed indicator) flows and the third and fourth transducers are positioned in a chamber having a static part open to the fluid in said tube.

The computation, which conveniently is performed automatically by a digital or analogue computer, is simplified by having the third and fourth transducer spaced apart a distance equal to the spacing between the first and second transducers. It will be appreciated that the total phase change along a path is proportional to the length of the path and that, if the spacings along the two paths are different, a proportionality factor can be introduced.

Preferably also the first and fourth transducers are enerized from a common source; this ensures that the frequencies are the same and thereby further simplifies the computations.

As will be explained hereinafter, the calculation of the speed from the two phase angle readings is relatively simple but, since airborne digital computers are commonly required for other navigational purposes, it is convenient to make use of such a digital computer by providing digital encoding means for encoding the phase angle outputs and for feeding the diigtal information into the computer.

The following is a description of one embodiment of the invention reference being made to the accompanying drawing which is a diagram illustrating a speed measuring apparatus for use on an aircraft.

Referring to the drawing, the body of the apparatus is indicated generally at 10 and includes a passage 11 through which the air can flow freely. It is in this passage that the velocity of the air is to be measured. For this purpose, there is provided a transmitting transducer 12 and a receiving transducer 13 which are spaced apart a distance D along the passage 11 in the direction of the air flow. Small transducers are employed to minimise disturbance to the air flow. For a supersonic aircraft, the receiving transducer would have to be placed downstream from the transmiting transducer. The transmitting transducer 12 is energised from an ultrasonic frequency signal generator 15 producing an alternating electrical signal which typically might be of a frequency of 40 kc./s. From the passage 11 a static port 16 opens into a static chamber 17 containing a further transmitting transducer 18 and receiving transducer 19. The static port 16 insures that the air in the chamber 17 is at the same static pressure and the same temperature as the air in the passage 11. These two transducers 18, 19 are conveniently placed apart the same distance D as the transducers 12, 13 and the transmitting transducer 12 is energized from the signal generator 15. In the following explanation of the manner of operation of the device, it will be assumed that the two pairs of transducers are equally spaced. It will be appreciated however that, if the spacing differs, a simple correction may be made to the phase determination between the received and transmitted signals of one of the pairs of transducers introducing a proportionality factor dependent on the ratio of the two spacings.

The phase relationship between the electrical output from the signal generator 15 and the electrical signal output from the receiving transducer 13 is determined by a phase discriminator 20 which provides sine and cosine direct voltage signals representative of the phase angle between the two inputs discriminator on leads 21 and 22. These sine and cosine signals are fed to orthogonal coils of a crossed-coil instrument 23 having a rotor which takes up a position in accordance with the phase angle and which drives integrating counters to count complete cycles of phase change. This instrument drives a digital encoder 24 to give digital outputs representative of the total determined phase difference. The phase discriminator 20 may be constructed in the known manner for example as is described in the aforementioned British specification Nos. 620,507 and 624,042 and the crossed-coil instrument may be constructed in a manner described in the aforementioned specification No. 2,499,326.

A further phase discriminator 25 compares the phase of a signal on lead 26 from the receiving transducer 19 with the signal on lead 27 from the signal generator 15. The sine and cosine outputs from the phase discriminator 25 are applied to a crossed-coil instrument 26 which drives a digital encoder 27. In this particular embodiment the outputs from the digital encoders 24, 27 are fed to a digital computer 28 which gives the speed indication on an indicator 29.

The operation of the device may be explained in the following way. Assume that the frequency of the generator 15 is $f$ and that the velocity of propagation of sound in air and at an arbitrary datum temperature is C. Assume also that phase difference between the received and transmitted signals in the passage 11 is $\theta_1$ and the phase difference between the received and the transmitted signals in the static chamber is $\theta_2$. It is convenient to calibrate the instrument at the datum temperature with zero air flow through the passage 11 and, in this condition set the total phase shift is $N_0$ complete cycles. It is convenient however to set the phase discriminators to indicate zero phase difference; the phase discriminators thus in effect register the changes from the datum $N_0$.

Now suppose that in operation there is air flowing through the passage 11 in the direction of the propagation of the sound and with a velocity V and that the temperature of the system and the static pressure is such that the velocity of sound in air has changed to $C_1$. Then the number of complete cycles of phase difference between the receiver and transmitter in the tube passage 11 is $N_0+N_1$ where $N_1$ is the indication on 23. Similarly between the transmitter and receiver in the static chamber the number of complete cycles of phase change is now $N_0+N_2$ where $N_2$ is the indication on 26. $N_1$ and $N_2$ are thus the changes in the number of cycles in the two channels respectively.

Then $$\frac{Df}{C+V}=N_0+N_1$$

and $$\frac{Df}{C_1}=N_0+N_2$$

Thus $$N_0+N_1=\frac{Df(N_0+N_2)}{Df+V(N_0+N_2)}$$

Hence $$V(N_0+N_2)=Df\left[\frac{N_0+N_2}{N_0+N_1}-1\right]$$

and so $$V=Df\left[\frac{N_2-N_1}{N_0^2-N_0(N_1+N_2)+N_1N_2}\right]$$

But $\theta_1=2\pi N_1$, and $\theta_2=2\pi N_2$ and hence $$V=a\left[\frac{\theta_2-\theta_1}{b^2+b(\theta_2+\theta_1)+\theta_1\theta_2}\right]$$

where $a=2\pi Df$ and $b=2\pi N_0$.

It will be seen that V can be calculated from $\theta_1$ and $\theta_2$ provided D, $f$ and $N_0$ are known. The effect of variations of speed of sound in air is eliminated. When switching on the apparatus at some temperature other than the calibration temperature, the outputs on the crossed-coil instruments 23, 26 will not be zero due to the different velocity of propagation sound waves at this temperature. The crossed-coil instruments will show the correct fractional value of N but, if the temperature is sufficiently different from the calibration temperature, an integral number of complete revolutions must be set into each crossed-coil instrument. This may readily be done however using a suitable calibration chart after measuring the temperature. It will be appreciated that only an approximate measurement of temperature is necessary since it is merely necessary to correct for the number of complete cycles of phase change; the fractions of a cycle of phase change are automatically indicated correctly by the crossed-coil instruments so that the accuracy of speed determination of the apparatus is not affected by this manual setting when the instrument is first switched on provided the setting is to the correct number of complete cycles.

In the explanation above, it has been assumed that the transmitting and receiving transducers are exactly aligned, as shown in the drawing, with the direction of the air flow of which the speed is to be measured. If however the signal path through the air, or other fluid, is at an angle to the direction of flow, then calculation made above will determine the component of speed measured along the signal path and it will then be necessary to introduce a correction factor (the secant of the angle between the fluid flow and measurement path).

I claim:
1. A speed measuring device for a body movable in a fluid comprising means on the body for propagating a sonic signal along a path through the fluid moving relatively to the body, a first phase determining means on the body for measuring the phase relation between the sonic signal at points spaced in the direction of motion, a chamber in said body to which is admitted fluid to be substantially at rest relative to said body, means for propagating a sonic signal through said fluid in said chamber and a second phase determining means for measuring the phase relation between the sonic signal at points spaced apart in the direction of propagation of the signal through the chamber.

2. A speed measuring device as claimed in claim 1 wherein said each of means for measuring the phase relation comprises a phase discriminator for determining the phase angle between the signals at said points and integrating means responsive to the output of the phase discriminator for counting complete cycles of phase change in said output.

3. A speed measuring device for a body movable in a fluid comprising first and second transducers mounted on the body in said fluid and spaced in the direction of motion, said first transducer being for transmitting sonic signals and the second transducer for receiving the sonic signals from the first transducer after passing through the fluid, a first phase comparison means for comparing the phase of the signal received by said second transducer with the phase of the transmitted signal, a chamber to which is admitted fluid to be substantially at rest relative to the body, third and fourth transducers spaced apart in said chamber, the third transducer receiving sonic signals from the fourth transducer, and a second phase comparison means for comparing the phase of the signal received by said third transducer with the phase of the signal transmitted by said fourth transducer.

4. A speed measuring device as claimed in claim 3 wherein said phase comparison means comprises a phase discriminator producing electrical output signals representative of the phase angle between the two signals to be compared and an integrating counter responsive to the output of the phase discriminator to count complete cycles of phase change.

5. A speed measuring device as claimed in claim 3 wherein the first and second transducers are spaced apart along a tube through which the fluid flows and wherein the third and fourth transducers are positioned in a chamber having a static pressure port open to the fluid in said tube.

6. A speed measuring device as claimed in claim 3 wherein the third and fourth transducers are spaced apart a distance equal to the spacing between the first and second transducers.

7. A speed measuring device for a body movable in a fluid comprising first and second transducers mounted on said body in said fluid and spaced in the direction of motion, the first transducer being an electrical to sonic signal transducer and the second being a sonic to electrical signal transducer, a chamber on said body having a static port through which fluid is admitted to said chamber to be substantially at rest relative to said body, a third transducer for transducing sonic to electrical signals, a fourth transducer for transducing electrical to sonic signals, said third and fourth transducers being spaced in said chamber, an ultrasonic frequency signal generator feeding electrical signals to said first and fourth transducers, a first phase comparison means including an integrating phase cycle counter for comparing the phase of the signal received by said second transducer with the phase of the output of said signal generator, a second phase comparison means including an integrating phase cycle counter for comparing the phase of the signal received by said third transducer with the phase of the output of said signal generator and computing means responsive to the outputs of both phase comparison means for indicating the velocity of the fluid with respect to said body.

8. A speed measuring device as claimed in claim 7 wherein each of said phase comparison means drives a digital encoder and wherein said computer is a digital computer.

References Cited

UNITED STATES PATENTS

| | | | |
|---|---|---|---|
| 2,274,262 | 2/1942 | Wolff | 73—194 |
| 2,841,775 | 7/1958 | Saunders | 73—181 |
| 2,908,888 | 10/1959 | Kirkland | 73—181 |
| 2,949,773 | 8/1960 | Batchelder | 73—194 |
| 2,991,650 | 7/1961 | Katzenstein et al. | |
| 3,209,591 | 10/1965 | Lester et al. | 73—194 |

LOUIS R. PRINCE, *Primary Examiner.*

DAVID SCHONBERG, *Examiner.*

NEIL B. SIEGEL, *Assistant Examiner.*